(12) United States Patent
Yamauchi

(10) Patent No.: US 9,908,073 B2
(45) Date of Patent: Mar. 6, 2018

(54) FILTER REGULATOR

(71) Applicant: Koganei Corporation, Tokyo (JP)

(72) Inventor: Takeshi Yamauchi, Tokyo (JP)

(73) Assignee: Koganei Corporation, Koganei-shi, Tokyo (JP)

( * ) Notice: Subject to any disclaimer, the term of this patent is extended or adjusted under 35 U.S.C. 154(b) by 33 days.

(21) Appl. No.: 15/125,456

(22) PCT Filed: Aug. 26, 2014

(86) PCT No.: PCT/JP2014/072319
§ 371 (c)(1),
(2) Date: Sep. 12, 2016

(87) PCT Pub. No.: WO2015/141024
PCT Pub. Date: Sep. 24, 2015

(65) Prior Publication Data
US 2017/0072357 A1 Mar. 16, 2017

(30) Foreign Application Priority Data

Mar. 20, 2014 (JP) ................................. 2014-058037

(51) Int. Cl.
*G05D 16/06* (2006.01)
*B01D 46/00* (2006.01)
(Continued)

(52) U.S. Cl.
CPC ..... *B01D 46/0087* (2013.01); *B01D 35/1475* (2013.01); *B01D 46/0012* (2013.01);
(Continued)

(58) Field of Classification Search
CPC ........................ G05D 16/0655; G05D 16/0663
(Continued)

(56) References Cited

U.S. PATENT DOCUMENTS 3,221,762 A * 12/1965 Chinn ................ G05D 16/0663
137/116.5
6,068,014 A * 5/2000 Tomita ............... G05D 16/0666
137/116.5
(Continued)

FOREIGN PATENT DOCUMENTS

CN 102287535 A 12/2011
JP 59-182717 U 12/1984
(Continued)

OTHER PUBLICATIONS

Fispa; GB 1502917 A; Mar. 8, 1978; Original Document.*
(Continued)

*Primary Examiner* — Marina Tietjen
*Assistant Examiner* — Paul J Gray
(74) *Attorney, Agent, or Firm* — McCormick, Paulding & Huber LLP

(57) ABSTRACT

A filter regulator improved in efficiency of assembling and detaching a filter element and a valve spring at the time of maintenance is disclosed herein. A valve is disposed so as to face a valve seat provided to an opening end of a communication hole through which a primary port and a secondary port communicate with each other, and a valve spring applies a spring force to the valve in a direction of closing the communication hole. A plurality of retaining bars are provided to a port block, elastically-deformable front ends thereof are radially displaced between a closed steady state and an opened state, and with the valve spring disposed, engaging claws are provided to the front ends of the retaining bars, and engage with the other end of the valve spring disposed. A filter element is attached to the outside of the retaining bars.

6 Claims, 10 Drawing Sheets

(51) Int. Cl.
*B01D 35/147* (2006.01)
*B01D 46/42* (2006.01)

(52) U.S. Cl.
CPC ..... *B01D 46/4272* (2013.01); *G05D 16/0655* (2013.01); *G05D 16/0663* (2013.01)

(58) Field of Classification Search
USPC ..... 137/18.18, 116.3, 116.5, 315.04, 315.05, 137/315.27, 315.33
See application file for complete search history.

(56) References Cited

U.S. PATENT DOCUMENTS

| | | | | |
|---|---|---|---|---|
| 8,523,541 | B2* | 9/2013 | Hermann | F04B 1/0452 137/15.19 |
| 2003/0164190 | A1* | 9/2003 | Ellero | G05D 16/0663 137/505.42 |
| 2004/0231726 | A1* | 11/2004 | Nakajima | G05D 16/0672 137/505.18 |
| 2009/0272442 | A1 | 11/2009 | Fishwick | |
| 2009/0283160 | A1 | 11/2009 | Fishwick et al. | |
| 2012/0216882 | A1 | 8/2012 | Fishwick et al. | |
| 2012/0216895 | A1 | 8/2012 | Fishwick et al. | |
| 2014/0150903 | A1 | 6/2014 | Yamauchi | |

FOREIGN PATENT DOCUMENTS

| | | |
|---|---|---|
| JP | H02-2716 U | 1/1990 |
| JP | 3010995 U | 5/1995 |
| JP | 2013-150948 A1 | 8/2013 |
| WO | 2012-157398 A1 | 11/2012 |

OTHER PUBLICATIONS

Drutu et al.; EP 0796991 A; Sep. 24, 1997; Original and Translation.*
International Search Report for PCT Serial No. PCT/JP2014/072319 dated Nov. 14, 2014.

* cited by examiner

FILTER REGULATOR

CROSS REFERENCE TO RELATED APPLICATION

This application is entitled to the benefit of and incorporates by reference subject matter disclosed in International Patent Application No. PCT/JP2014/072319 filed on Aug. 26, 2014 and Japanese Patent Application No. 2014-058037 filed on Mar. 20, 2014, the contents of all of which are incorporated by reference herein.

TECHNICAL FIELD

The present invention relates to a filter regulator adapted to purify compressed air to be supplied to a pneumatic apparatus, etc., and adapted to regulate the pressure of the compressed air.

BACKGROUND ART

Conventionally, a filter and a regulator are provided to an air pressure line for supplying compressed air from an air pressure source to a supply destination such as a pneumatic apparatus. The filter is used to eliminate foreign matters contained in the compressed air, such as water droplet, oil droplet, and dust, to purify the compressed air. The regulator is used to regulate the pressure of compressed air to be supplied from the air pressure source to the supply destination, to regulate a set pressure. A filter regulator has a function of eliminating foreign matters contained in compressed air to purify the compressed air and a function of regulating the pressure of compressed air.

The filter regulator includes a port block provided with a primary port and a secondary port. Primary-side compressed air is supplied to the primary port from an air pressure source, and secondary-side compressed air purified and regulated in pressure is discharged from the secondary port. A collection container is removably attached to a lower part of the port block, so that foreign matters contained in compressed air, such as water droplet, is collected and stored in the collection container. The port block is provided with a through-hole, and the primary port and the secondary port communicate with each other via the through-hole. A valve body is provided to a valve shaft provided in the through-hole, and adapted to open and close an opening of the through-hole. A pressure setting mechanism is attached to an upper side of the port block. The pressure setting mechanism is adapted to open and close the valve body on the basis of a secondary-side pressure, thereby regulating the pressure of compressed air to be discharged from the secondary port, to a preset pressure.

A cylindrical filter element is detachably incorporated in the filter. Foreign matters contained in compressed air are eliminated by the filter element which is regularly replaced with new one. Japanese Laid-Open Patent Application Publication No. 2013-150948 describes a gas-liquid separator, i.e., filter that facilitates filter element replacement.

SUMMARY OF THE INVENTION

In this gas-liquid separator, a plug is detachably provided to an inlet/outlet member, that is, an upper part of a port block, and a filter element is attached to the plug. Since a filter regulator has a pressure setting mechanism disposed on the port block, the filter element cannot be attached to and detached from the upper part of the port block. The filter element, therefore, has to be attached to and removed from the lower part of the port block. Like the filter element, the valve may also be replaced and has to be attached and removed from the lower part of the port block.

A conventional filter regulator includes a valve guide attached to the inside of the filter element. The filter element is held between a flange provided to the lower end of the valve guide and the port block. When the valve guide is removed upon replacing the filter element, the valve and a valve spring, each of which is disposed on the inside of the valve guide, are removed together with the valve guide.

When only the filter element is replaced, therefore, the valve and the valve spring are removed from the port block. Thus, when a new filter element is attached to the port block, the valve and the valve spring must also be attached to the port block. When the filter element and the valve are replaced, an assembly of a new filter element and valve must be attached to the port block. In this manner, since the conventional filter element is inferior in assembling efficiency, the filter regulator is as a whole inferior in efficiency of an assembling process of the filter element, An object of the present invention is to provide a filter regulator improved in assembling efficiency.

Another object of the present invention is to provide a filter regulator improved so as to efficiently replace a filter element and a valve.

According to one aspect of the present invention, there is provided a filter regulator which purifies compressed air, adjusts a pressure of the compressed air, and discharges the purified and pressure-adjusted compressed air to outside, the filter regulator comprising: a port block including: a primary port into which compressed air flows, a secondary port through which the purified and pressure-adjusted compressed air is discharged to outside, and a communication hole through which the primary port and the secondary port communicate with each other; a valve disposed so as to face a valve seat provided to an opening end of the communication hole, the valve being driven by a pressure adjusting mechanism provided to the port block to open and close the communication hole; a valve spring which abuts on the valve, the valve spring applying a spring force to the valve in a direction of closing the communication hole; elastically-deformable retaining bars in which base ends thereof are attached to the port block, and front ends thereof are radially displaced between a closed steady state and an opened state; engaging claws provided to the front ends of the retaining bars, the engaging claws engaging with the other end of the valve spring disposed on the inside of the retaining bars when the retaining bars are in the closed steady state; and a filter element attached to the outside of the retaining bars when the front ends of the retaining bars are in the closed steady state, wherein the valve and the valve spring are attached to the inside of the retaining bars when the front ends of the retaining bars are in the opened state.

A port block is provided with a plurality of retaining bars. A valve for opening and closing a through-hole and a valve spring for applying a spring force to the valve in a direction causing the valve to close the through-hole are disposed on the inside of the retaining bars. Engaging claws are respectively provided to distal ends of the retaining bars. A filter element is attached outside the retaining bars. When the retaining bars are in a steady state, that is, in a closed state, the retaining bars retain the valve spring by their engaging claws, and the retaining bars collectively have an overall outer diameter smaller than the inner diameter of the filter element. Therefore, the filter element can be attached and detached with ease. It is possible to improve the filter regulator so as to replace the filter element and the valve, thus improving the assembling efficiency of the filter regulator.

DESCRIPTION OF THE PREFERRED EMBODIMENTS

Figure 1:
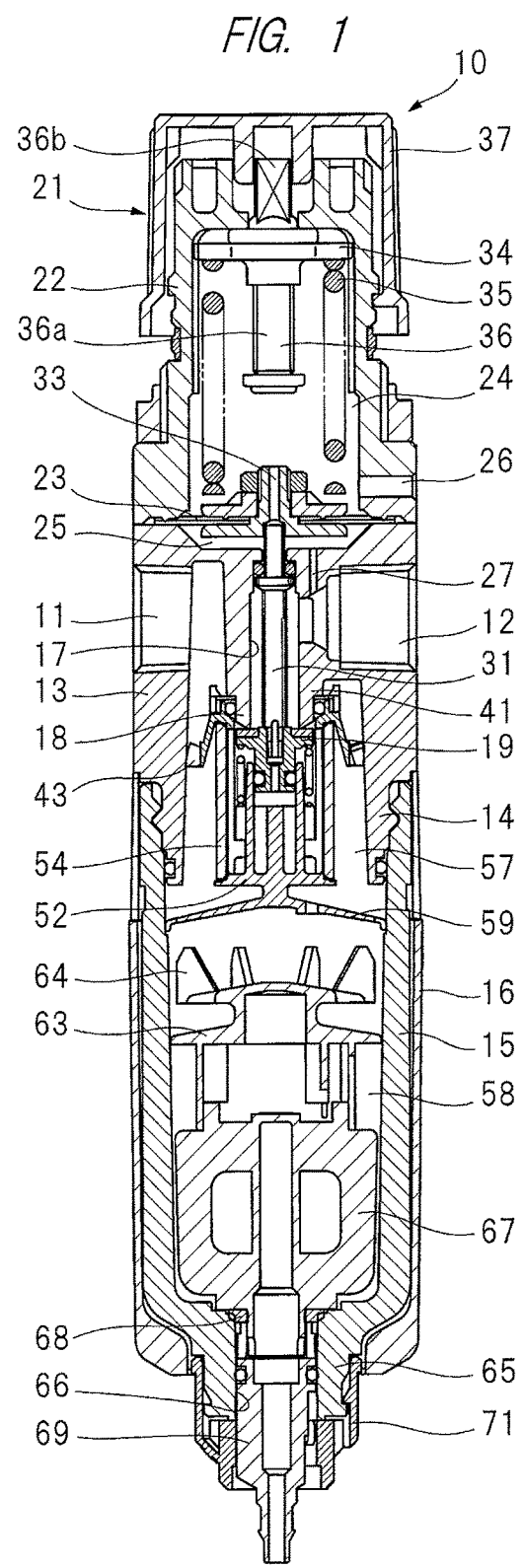
FIG. 1 is a sectional view showing one embodiment of a filter regulator according to the present invention.

Hereinafter, one embodiment of the present invention will be described in detail with reference to the drawings. As shown in FIG. 1, a filter regulator 10 includes a port block 13 provided with a primary port 11 and a secondary port 12. The port block 13 has a rectangular cross section. The primary port 11 and the secondary port 12 are axially aligned with each other in the port block 13. However, the primary port 11 and the secondary port 12 may be formed in the port block 13 such that both ports are perpendicular to each other.

The primary port 11 is connected to a primary pipeline, and primary-side compressed air is supplied to the filter regulator 10 from an air pressure source via the primary pipeline. The secondary port 12 is connected to a secondary pipeline, and purified secondary-side compressed air adjusted in pressure is supplied through the secondary pipeline toward a supply destination such as pneumatic apparatus. The port block 13 has a lower end provided with a cylindrical portion 14, and a collection container 15 is screwed to the cylindrical portion 14 so that the collection container 15 can be attached to and detached from the port block 13. Foreign matters, such as droplet, contained in the primary-side compressed air is eliminated and stored in the collection container 15. The collection container 15 is formed of transparent resin, and therefore allows the foreign matters stored in the collection container 15 to be observed from outside. The collection container 15 has an outer face covered with a protective cover 16 formed with a slit (not shown) via which the inside of the collection container 15 can be observed from outside.

The port block 13 has a communication hole 17 through which the primary port 11 and the secondary port 12 communicate with each other. The primary port 11 communicates with an opening end of a lower end of the communication hole 17, while the secondary port 12 opens on an outer peripheral face of an upper part of the communication hole 17, and communicates with the communication hole 17. A valve seat 18 is provided to the opening end of the communication hole 17. A valve 19 is disposed so as to face the valve seat 18, and adapted to open and close the communication hole 17.

Figure 2:
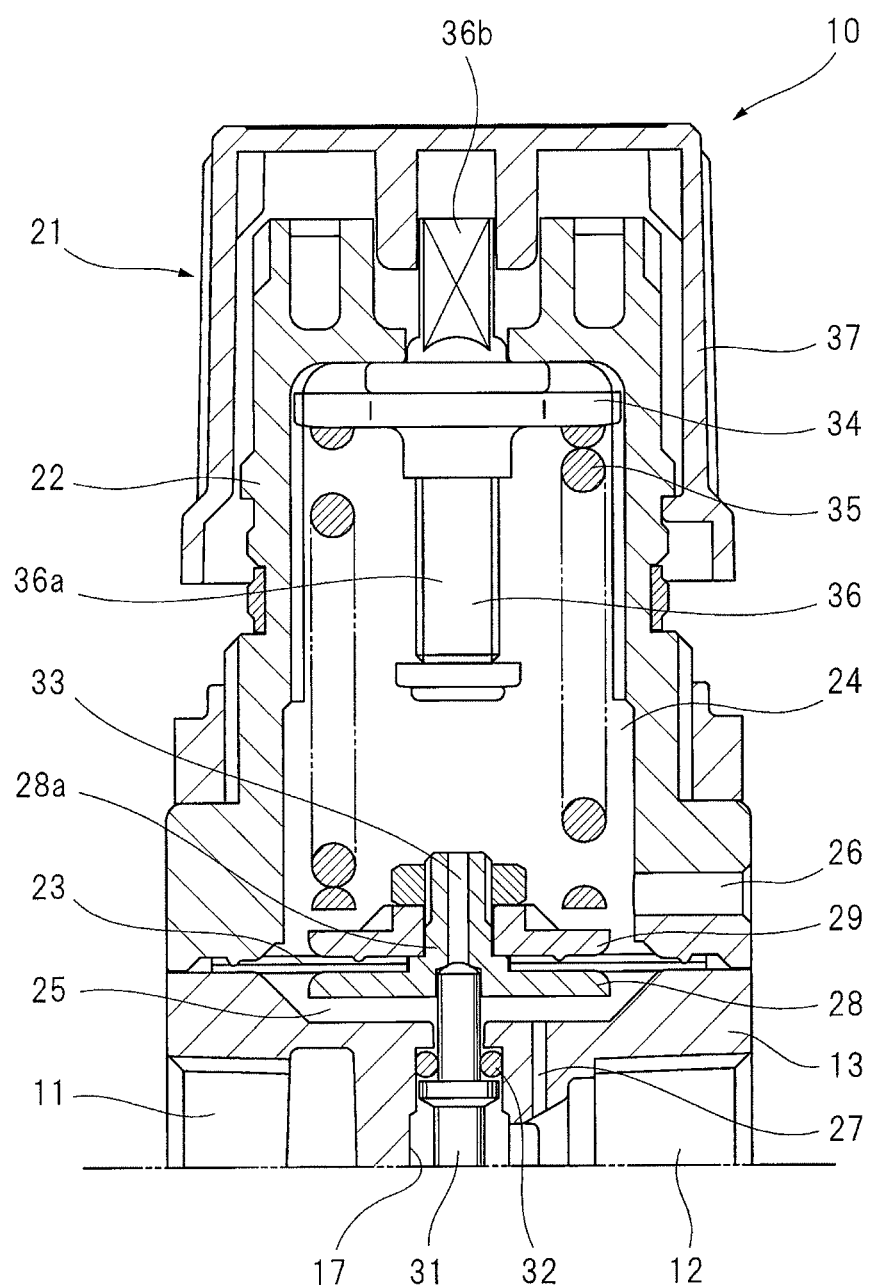
FIG. 2 is an enlarged sectional view showing an upper-side part of the sectional view of FIG. 1.

As shown in FIGS. 1 and 2, a pressure adjusting mechanism 21 for adjusting the pressure of the secondary-side compressed air to be discharged from the secondary port 12 is provided to an upper side of the port block 13. The pressure adjusting mechanism 21 has a bonnet 22 provided to the upper face of the port block 13. A diaphragm 23 capable of elastic deformation is provided between the port block 13 and the bonnet 22. A space formed by the port block 13 and the bonnet 22 is partitioned by the diaphragm 23 into a spring chamber 24 and a pilot pressure chamber 25. The spring chamber 24 communicates with the outside via a breathing hole 26 provided to the bonnet 22. The pilot pressure chamber 25 communicates with the secondary port 12 via a pilot hole 27 provided to the port block 13.

As shown in FIG. 2, on the same side of the diaphragm 23 as the pilot pressure chamber 25, a port disc 28 is attached to the diaphragm 23. A shaft portion 28a provided to the port disc 28 projects toward the spring chamber 24. A reinforcing disc 29 is attached to the shaft portion 28a. A valve shaft 31 is disposed in the communication hole 17, and movable in the axial direction. The valve shaft 31 is positioned between the valve 19 and the diaphragm 23. A sealing member 32 is attached to the valve shaft 31, and comes in sliding contact with an inner peripheral surface of the communication hole 17. A lower end face of the valve shaft 31 is in contact with the valve 19. An arc surface provided to an upper end of the valve shaft 31 is in contact with an opening end of a through-hole 33 provided to the shaft portion 28a of the port disc 28.

As shown in FIGS. 1 and 2, a spring support plate 34 is disposed on the inside of the bonnet 22, and it is in face-to-face relationship with the diaphragm 23. A pressure-adjusting spring 35 is disposed between the spring support plate 34 and the diaphragm 23. The pressure-adjusting spring 35 is adapted to apply a spring force to the valve 19 via the valve shaft 31. This spring force acts in a direction of separating the valve 19 from the valve seat 18, that is, in a direction of opening the valve 19. An outer peripheral surface of the spring support plate 34 is in meshing engagement with an uneven portion provided to an inner peripheral surface of the bonnet 22 so as to extend in the axial direction. Therefore, the spring support plate 34 is prevented from being rotated. An adjuster screw 36 is rotatably attached to a top wall of the bonnet 22, and the adjuster screw 36 has a male screw portion 36a which is screwed to the spring support plate 34. A handle 37 having a cup-shaped section is attached to a projecting end 36b of the adjuster screw 36.

The handle 37 is attached to the projecting end 36b and movable in the axial direction. When the handle 37 is moved in a direction away from the bonnet 22 as shown in FIG. 1, the handle 37 is allowed to be rotated. On the other hand, when the handle 37 is moved in a direction toward the bonnet 22, the handle 37 is engaged with the bonnet 22, and prevented from being rotated. When the adjuster screw 36 is turned by a rotational manipulation of the handle 37, the spring force of the pressure-adjusting spring 35 is adjusted. In this manner, the pressure of the secondary-side air is set by the rotation operation of the handle 37.

Since the pilot pressure chamber 25 communicates with the secondary port 12 via the pilot hole 27, when the pressure of the secondary-side compressed air drops below a set pressure level, the pressure in the pilot pressure chamber 25 drops. When the pressure in the pilot pressure chamber 25 drops, the valve 19 is moved in a direction away from the valve seat 18 by the applied spring force of the pressure-adjusting spring 35 to the valve 19 via the valve shaft 31. Therefore, the opening end on the lower end of the communication hole 17 is opened. In this manner, the primary-side compressed air is supplied to the secondary port 12, and increases the pressure of the secondary-side compressed air.

When the pressure of the secondary-side compressed air is increased to the set pressure level, an increased pressure in the pilot pressure chamber 25 brings the valve 19 into contact with the valve seat 18, thereby closing the opening end on the lower end of the communication hole 17. In this manner, an opening degree of the valve 19 is adjusted according to the pressure in the pilot pressure chamber 25, and the pressure of the secondary-side air is controlled to the set pressure level. When the pressure of the secondary-side air becomes higher than the set pressure level, an increased pressure in the pilot pressure chamber 25 moves the diaphragm 23 in a direction away from the valve shaft 31. As a result, the through-hole 33 is opened, and the secondary-side compressed air is discharged to the outside via the through-hole 33, the spring chamber 24, and the breathing hole 26.

Figure 3:
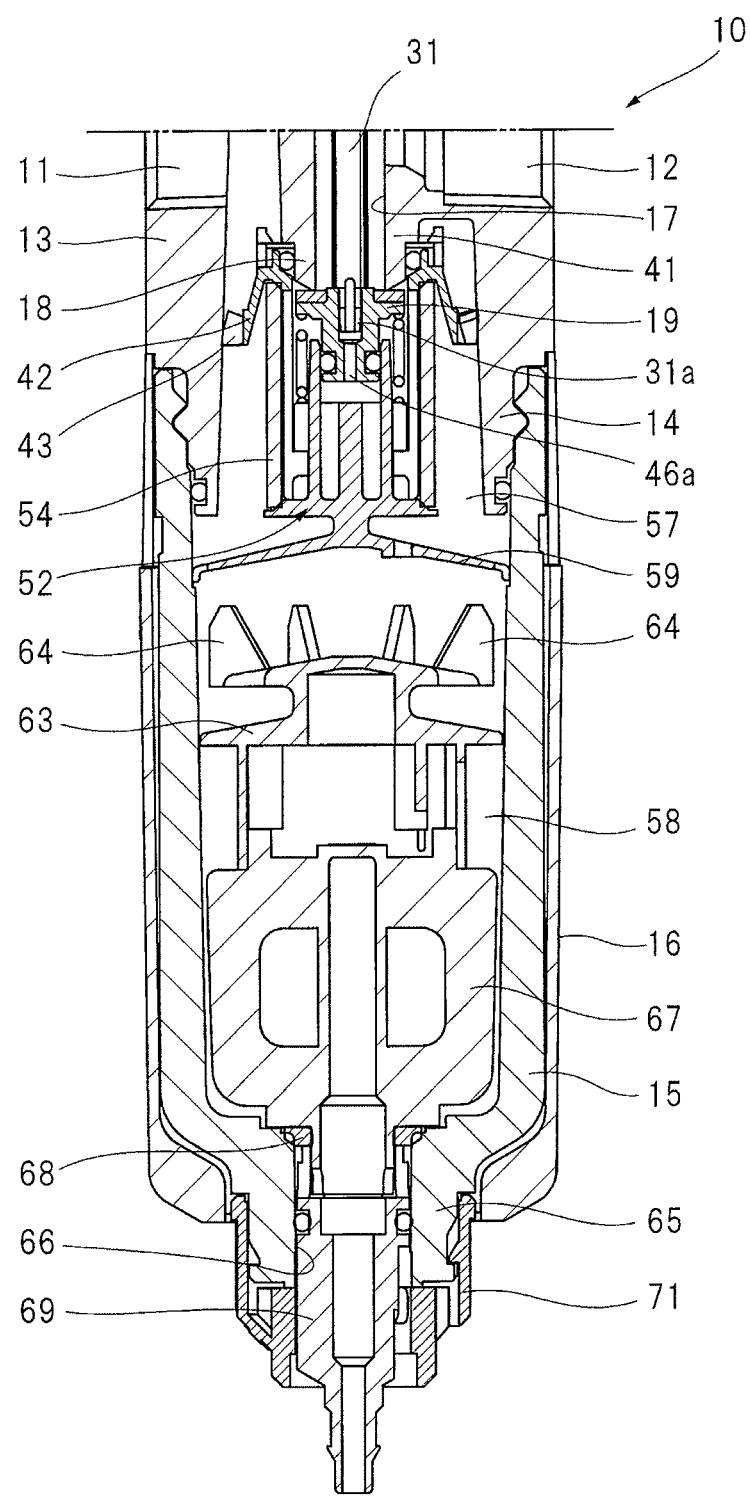
FIG. 3 is an enlarged sectional view showing a lower-side part of the sectional view of FIG. 1.
Figure 4:
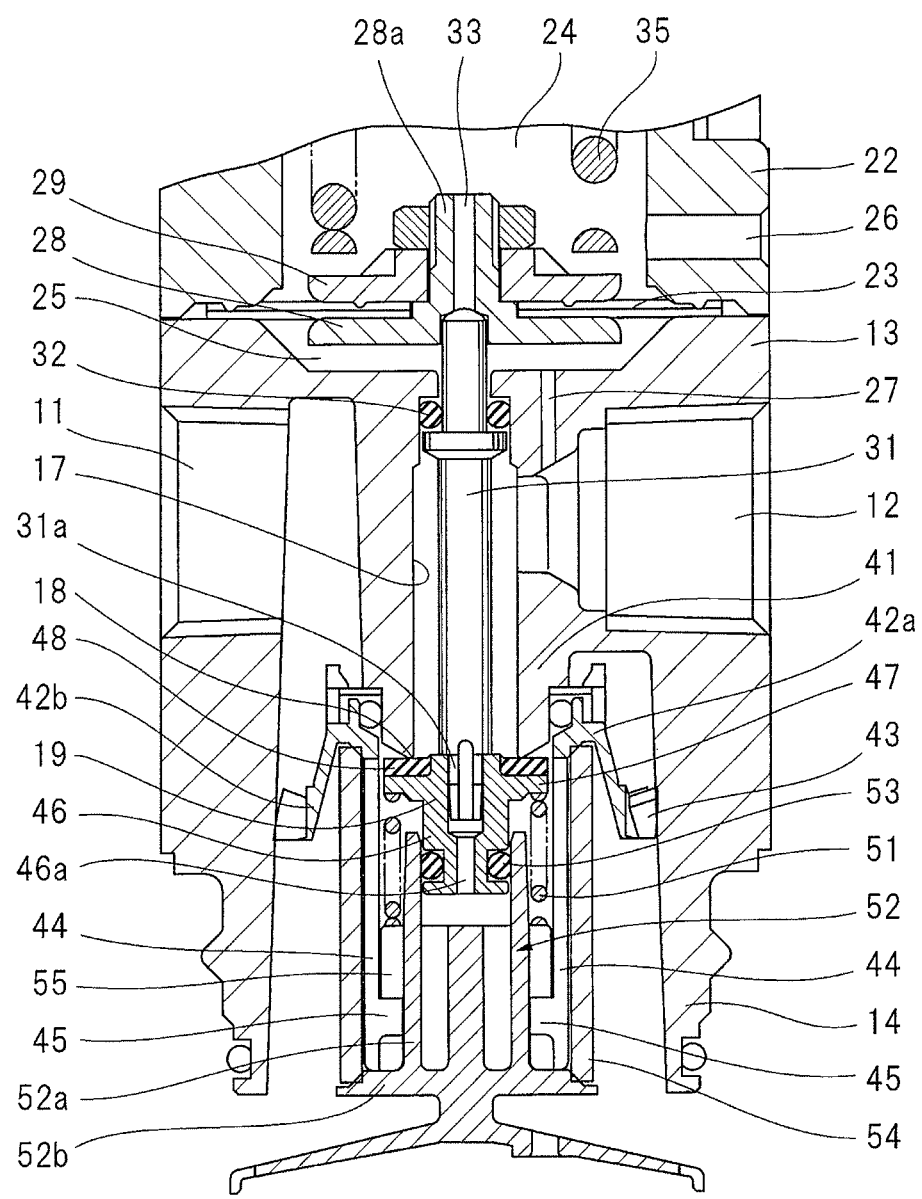
FIG. 4 is a sectional view showing a port block with a collection container removed from the port block.

As shown in FIGS. 3 and 4, a filter attaching portion 41 is provided to the port block 13. The valve seat 18 is provided to the lower end of the filter attaching portion 41. The port block 13 is provided with a resin louver 42 which has an annular base 42*a* and a tapered portion 42*b* integrally provided with the annular base 42*a*. Swirl vanes 43 are provided to the front end of the tapered portion 42*b*, and arranged at intervals in the circumferential direction. The swirl vanes 43 are adapted to swirl the compressed air from the primary port 11. Therefore, since the compressed air is swirled by the swirl vanes 43, and a centrifugal force acts on foreign matters such as water droplet and dust, the foreign matters are separated from the primary-side compressed air, and stick to the inner peripheral surface of the port block 13, and finally fall off. In this manner, such foreign matters as water droplet is eliminated from the primary-side compressed air.

As shown in FIG. 4, the base 42*a* of the louver 42 are integrally provided with a plurality of retaining bars 44. The base 42*a* of the louver 42 is defined as a base end of the retaining bars 44, the retaining bars 44 extend in the axial direction from the base end, and inwardly projecting engaging claws 45 are provided to front ends of the retaining bars 44. Since the base end of the four retaining bars 44 is integrally provided with the base 42*a* of the louver 42, each retainer bar 44 is attached to the port block 13 via the base 42*a*. The base 42*a* has four elastically-deformable retaining bars 44, each of which allows its front end having the engaging claw 45 to shift in the radial direction. Each of the retaining bars 44 is elastically deformed between a closed steady state in which the engaging claw 45 on its front end shifts radially inward, and an opened state in which the engaging claw 45 shifts radially outward. When the four retaining bars 44 are in the closed steady state, no external force is applied to the four retaining bars 44, and the retaining bars 44 are not deformed at all, the four retaining bars 44 stay straight as shown in FIGS. 1, 3, and 4. In this state, the outer diameter of the overall envelope of the four retaining bars 44 remains constant, from the base end to front end of the four retaining bars 44.

Figure 5:
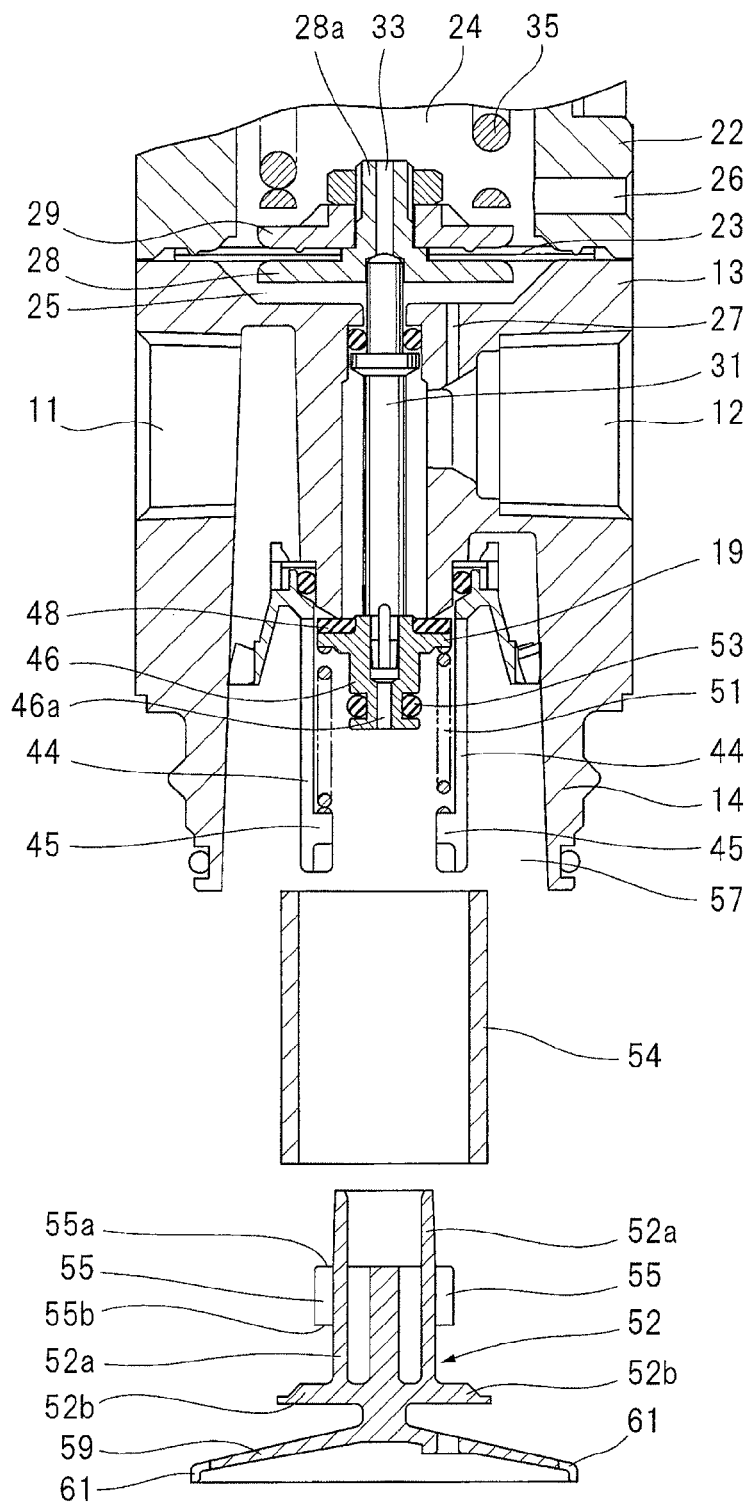
FIG. 5 is a sectional view showing the port block with a filter element and a valve guide detached from port block.

As shown in FIGS. 3 and 4, the valve 19 has a shaft portion 46 and a large-diameter projecting portion 47. The shaft portion 46 has a through-hole 46*a* in which a small-diameter front end 31*a* of the valve shaft 31 is inserted. The projecting portion 47 is provided with a rubber valve disc 48 which can be placed in contact with the valve seat 18. A valve spring 51 is disposed on the inside of the four retaining bars 44. The valve spring 51 abuts on the projecting portion 47 of the valve 19. The valve spring 51 applies a spring force to the valve 19 in a direction of closing the valve 19, that is, in a direction of causing the valve 19 to move toward the valve seat 18. When the front ends of the four retaining bars 44 are deformed outward by an external force, the valve 19 and the valve spring 51 are disposed on the inside of the four retaining bars 44. Subsequently, the external force is eliminated to let the deformed front ends return to their original state, which puts the four retaining bars 44 into their closed state. As a result, as shown in FIG. 5, one end of the valve spring 51 comes in contact with the valve 19, while the other end of the same engages with the engaging claws 45. In this manner, the valve 19 and the valve spring 51 are disposed on the inside of the four retaining bars 44 when they are deformed outward into their opened state by an external force.

In order to guide the valve 19 to open and close the valve 19, a valve guide 52 is incorporated on the inside of the four retaining bars 44. The valve guide 52 has: a cylindrical portion 52*a* for guiding the shaft portion 46 of the valve 19, the shaft portion 46 being slidable with respect to the cylindrical portion 52*a*; and a flange 52*b* integral with the cylindrical portion 52*a*. A sealing member 53 attached to the valve 19 is in sliding contact with an inner peripheral surface of the cylindrical portion 52*a*. When the valve guide 52 is attached to the four retaining bars 44, the flange 52*b* comes in contact with the front ends of the four retaining bars 44, thereby positioning the valve guide 52.

As shown in FIG. 5, a cylindrical filter element 54 is attached to the outside of the four retaining bars 44 when the four retaining bars 44 are in the closed state. With the cylindrical filter element 54 attached to the outside of the four retaining bars 44, the cylindrical portion 52*a* of the valve guide 52 is engaged with the shaft portion 46 of the valve 19. As a result, as shown in FIG. 4, the filter element 54 is held and fixed between the flange 52*b* of the valve guide 52 and the base 42*a* of the louver 42.

Figure 7:
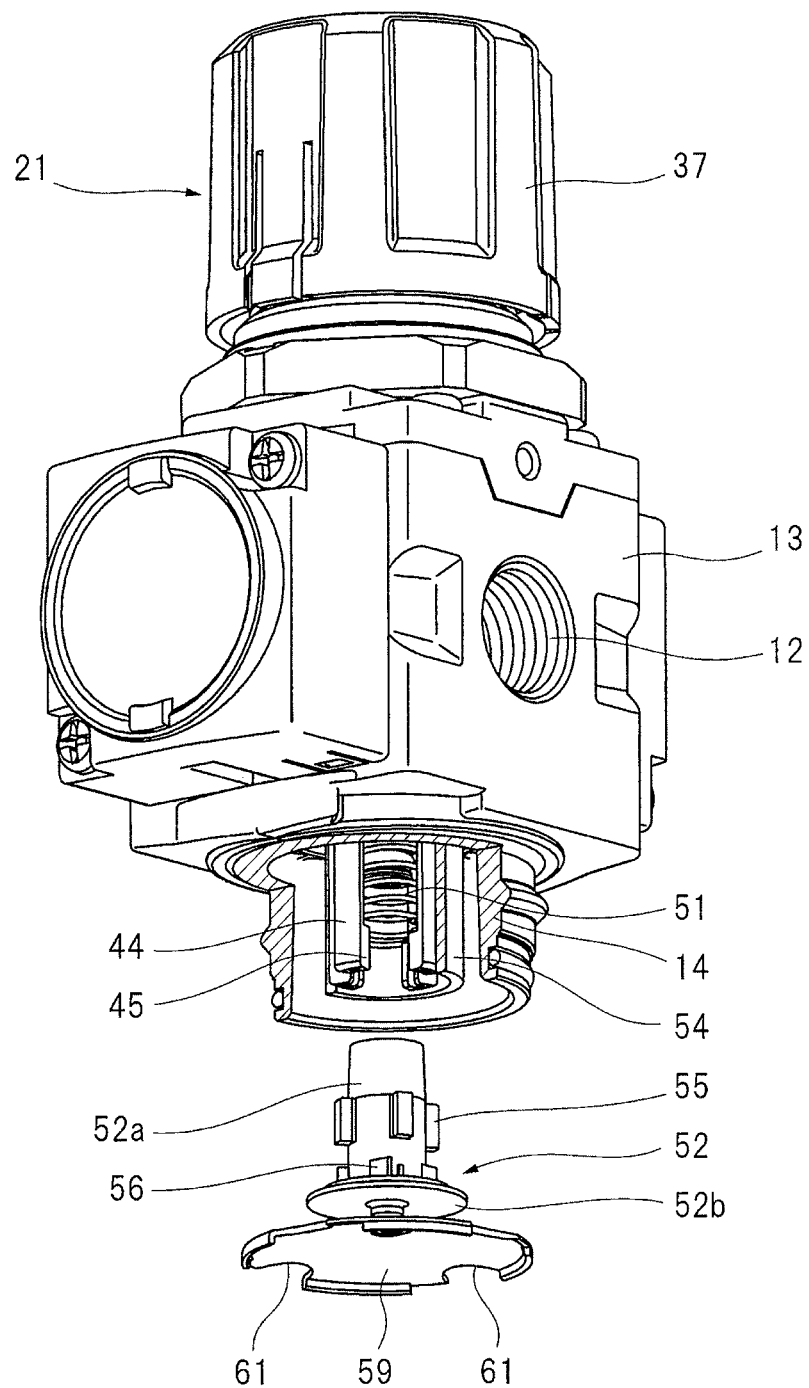
FIG. 7 is a partially cutaway perspective view showing the port block under the condition that the valve guide is about to be inserted into the port block with the valve spring and the filter element attached to the port block.

Engaging projections 55 which engage with the other end of the valve spring 51 are provided to the cylindrical portion 52*a* of the valve guide 52 such that the engaging projections 55 project radially outward. Four engaging projections 55 are provided so as to correspond to the four retaining bars 44. With an external force applied to the valve spring 51 via the valve guide 52 to compress the valve spring 51, the valve guide 52 is inserted on the inside of the four retaining bars 44. In this state, by pivoting the valve guide 52, the engaging projections 55 are placed so as to face the engaging claws 45 in an axial direction. By stopping an application of the external force compressing the valve spring 51, the engaging projections 55 engage with the engaging claws 45. As shown in FIG. 7, stoppers 56 are provided to the cylindrical portion 52*a* of the valve guide 52. By pivoting the valve guide 52, the stoppers 56 come in contact with the four retaining bars 44 to stop the valve guide 52 from further rotating, and determine a position causing the engaging claws 45 and the engaging projections 55 to engage with each other. The engaging projections 55 have upper surfaces serving as first engaging surfaces 55a which engage with the valve spring 51, and lower surfaces serving as second engaging surfaces 55b which engage with the engaging claws 45.

As shown in FIG. 5, a baffle plate 59 is integral with the valve guide 52. The baffle plate 59 divides a space below the louver 42 into a swirl chamber 57 and a reserve chamber 58 located below the swirl chamber 57. A cutout 61 is provided to the outer periphery of the baffle plate 59, and the swirl chamber 57 and the reserve chamber 58 communicate with each other via the cutout 61. The primary-side compressed air flowing from the primary port 11 into the filter regulator 10 is swirled by the swirl vanes 43. As a result, foreign matters contained in the primary-side compressed air collide with the inner wall surface of the swirl chamber 57 and fall off, and drop into the reserve chamber 58 via the cutout 61.

As shown in FIG. 1, an auxiliary baffle 63 is placed in the reserve chamber 58. The auxiliary baffle 63 is provided with fins 64 which prevent the swirling of compressed air, etc., flowing into the reserve chamber 58. The auxiliary baffle 63 is mounted on a leg 67 which is attached to a discharge hole 66 of an exhaust port 65 provided to the lower end of the collection container 15. The leg 67 is fitted with a sealing member 68 for sealing the discharge hole 66.

An exhaust pipe 69 for discharging foreign matters such as liquid reserved in the reserve chamber 58 to the outside is fitted in the exhaust port 65. An operating knob 71 is rotatably attached to the outer periphery of the exhaust port 65. The operating knob 71 has a cam engaged with the exhaust pipe 69, so that the operating knob 71 causes the exhaust pipe 69 to move up and down. When the exhaust pipe 69 is moved up by rotating the operating knob 71, the sealing member 68 releases the discharge hole 66 from its sealing state as the exhaust pipe 69 moves up, and causes liquid reserved in the reserve chamber 58 to flow out of the discharge hole 66. In this manner, the filter regulator 10 of FIG. 1 serves as a manual drain mechanism working in such a way that a user manually operates the operating knob 71 to drain the liquid in the reserve chamber 58 out of the filter regulator 10. Here, when a float is disposed on the inside of the reserve chamber 58, the filter regulator 10 works as an auto-drain mechanism which automatically drains the liquid out of the filter regulator 10.

A process of replacing the filter element 54 and the valve 19 attached to the filter regulator 10 will then be described. In order to replace the filter element 54 and valve 19, the collection container 15 is firstly removed from the port block 13. FIG. 4 shows the port block 13 with the collection container 15 removed from the port block 13.

In this state, the engaging projections 55 of the valve guide 52 are engaged with the engaging claws 45 of the four retaining bars 44, and the valve spring 51 is engaged with, i.e., in contact with the first engaging surfaces 55a of the engaging projections 55. In order to remove the valve guide 52 in this state, the valve guide 52 is pivoted to the left in FIG. 7 to shift the engaging projections 55 in a direction of leftward rotation from positions of the engaging claws 45. This disengages the engaging projections 55 from the engaging claws 45. As a result, the valve guide 52 is pushed downward by the spring force of the valve spring 51, out of the inside of the four retaining bars 44. When the valve guide 52 is removed out of the four retaining bars 44, the valve spring 51 engages with the engaging claws 45 as shown in FIG. 5, and it is retained by the four retaining bars 44, that is, prevented from dropping off.

In this state, the filter element 54 is pulled out from the outside of the four retaining bars 44. At this time, since the valve spring 51 engaged with the engaging claws 45 is held on the inside of the four retaining bars 44, the filter element 54 is removed easily without letting the valve spring 51 fall off. FIG. 5 shows a state in which the valve guide 52 is removed from the inside of the four retaining bars 44 and the filter element 54 is pulled out from the outside of the four retaining bars 44. In this manner, the filter element 54 is removed easily.

Figure 6:
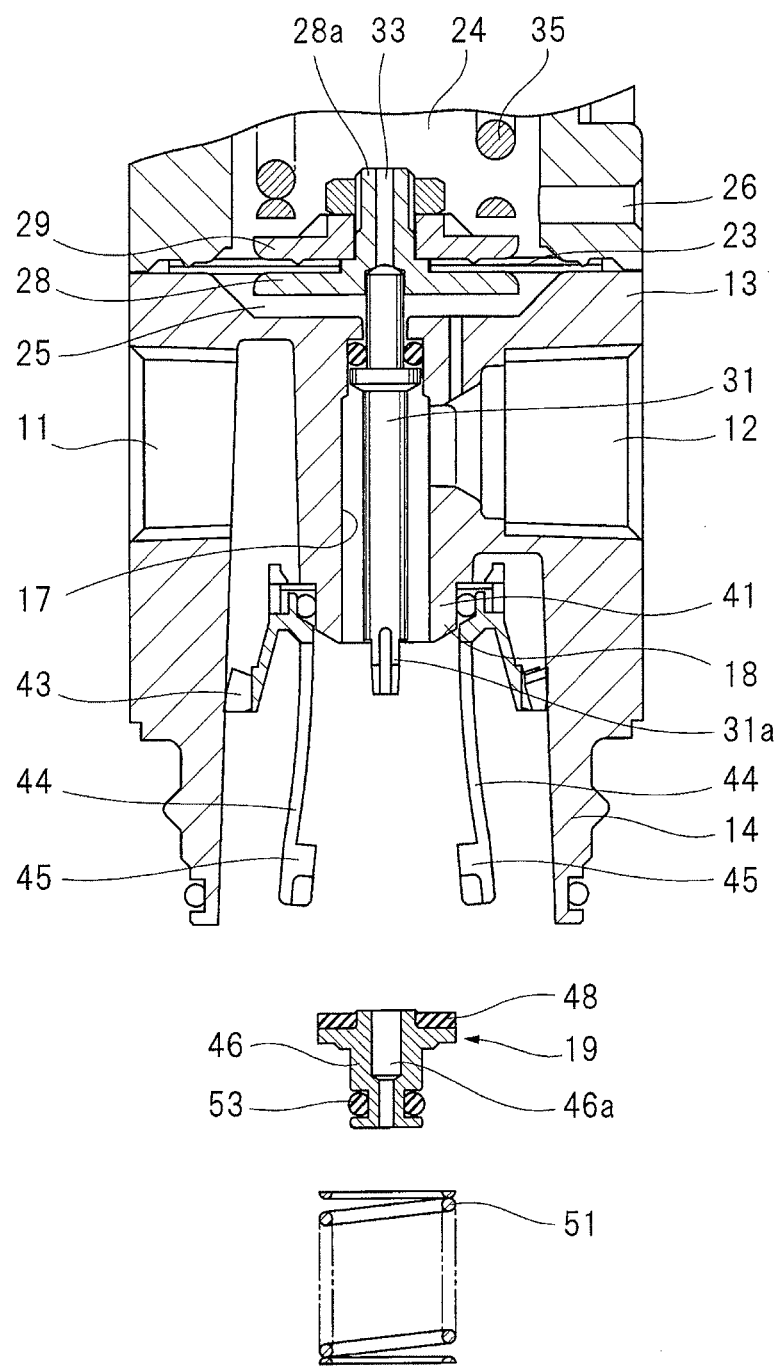
FIG. 6 a sectional view showing the port block with a valve and a valve spring further detached from the port block.

A process of detaching the valve 19 from the inside of the four retaining bars 44 will then be described. As shown in FIG. 6, the four retaining bars 44 are elastically deformed such that the front ends, i.e., engaging claws 45 of the four retaining bars 44 are moved radially outward. This increases the inner diameter of the front ends of the four retaining bars 44, thereby disengaging the valve spring 51 from the engaging claws 45 and allowing the valve spring 51 and valve 19 to be removed from the inside of the four retaining bars 44. In this manner, the valve spring 51 and the valve 19 are removed easily. Since the sealing member 32 of the valve shaft 31 is in contact with the inner peripheral surface of the communication hole 17 to provide a contact resistance which prevents the valve shaft 31 from falling off, after removal of the valve 19, the valve shaft 31 does not fall off.

On the other hand, an assembling process of replacing the valve 19 and filter element 54 with a new valve and a new filter element and incorporating them in the filter regulator 10 at the time of maintenance, and an assembly process of incorporating the valve 19 and the filter element 54 into the filter regulator 10 during a manufacturing process for the filter regulator 10 are carried out in the following manner.

As shown in FIG. 6, the four retaining bars 44 are elastically deformed radially outward, and the valve 19 and the valve spring 51 are disposed on the inside of the four retaining bars 44. Then, the four retaining bars 44 deformed radially outward return to their original state in which the valve spring 51 comes in contact with, i.e., engages with the engaging claws 45. In this manner, the valve spring 51 and valve 19 are held on the inside of the four retaining bars 44 without falling off. In this state, the filter element 54 is attached to the outside of the four retaining bars 44.

Figure 8:
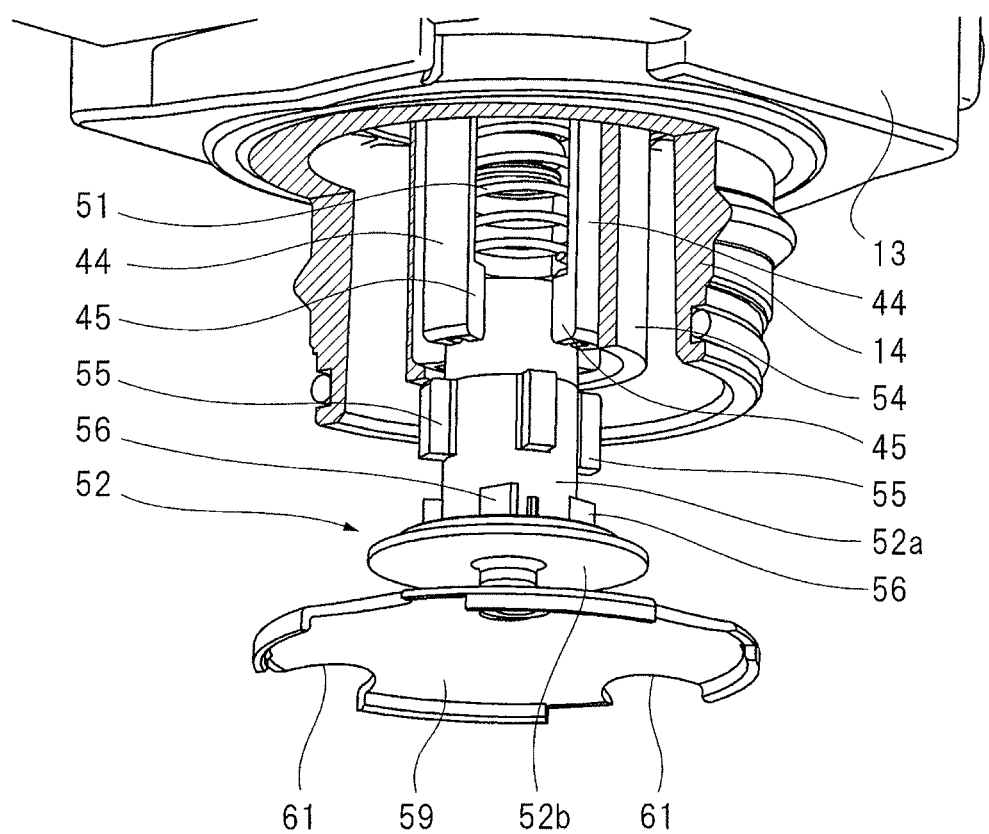
FIG. 8 is a partially cutaway perspective view showing the port block with the valve guide partially inserted into a space formed inside retaining bars.

FIG. 7 shows a state of the filter element 54 inserted on the outside of the four retaining bars 44. In this state, the valve guide 52 is inserted on the inside of the four retaining bars 44 and on the inside of the valve spring 51. At this time, as shown in FIG. 8, the valve guide 52 is set to a position so that the engaging projections 55 do not interfere with the four retaining bars 44, that is, the position of the engaging projections 55 correspond to the position of gaps between the four retaining bars 44 adjacent to each other in the circumferential direction across the gaps, and then the valve guide 52 is inserted.

Figure 9:
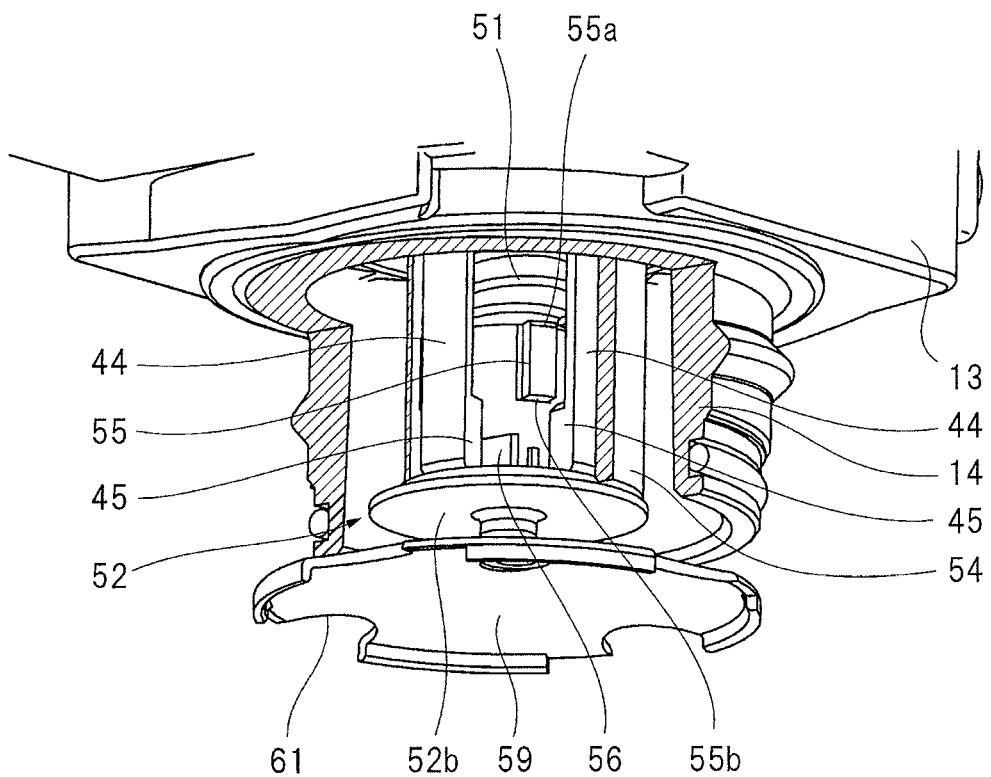
FIG. 9 is a partially cutaway perspective view showing the port block with the valve guide inserted into the space inside the retaining bars from the state of FIG. 8, and engaging claws thereof brought into contact with the valve spring.

FIG. 9 shows a state of the valve guide 52 set to a rotational position by pushing the valve guide 52 from below and inserting the valve guide 52 on the inside of the valve spring 51. At this time, the valve spring 51 is in a state abutting on the engaging surfaces 55a of the engaging projections 55 of the valve guide 52, and held between the engaging projections 55 and the valve 19.

Figure 10:
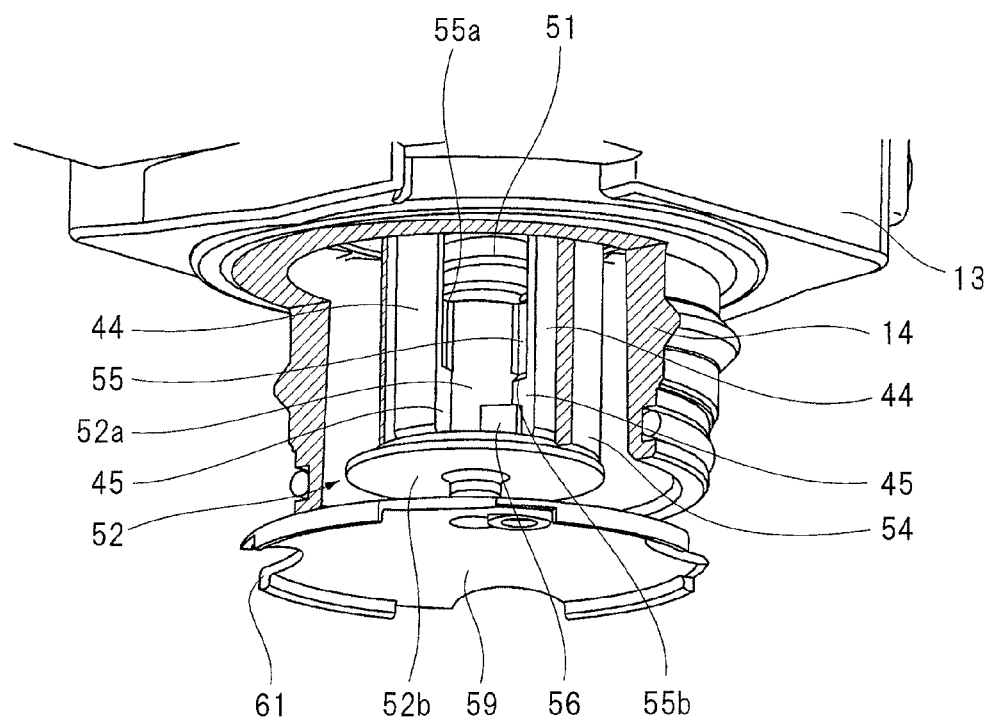
FIG. 10 is a partially cutaway perspective view showing the port block with the valve guide pivoted from the state of FIG. 9, and the engaging claws thereof brought into contact with respective stoppers so that the valve guide is prevented from being further pivoted from this state.

When the valve guide 52 is pivoted to the right in this figure, the stoppers 56 abut on the four retaining bars 44 to prevent the valve guide 52 from being pivoted as shown in FIG. 10. This rotation preventing position is defined as a position causing the second engaging surfaces 55b of the engaging projections 55 to face the engaging claws 45. When the rotation operation is stopped and the force applied to the valve guide 52 from below is canceled, the engagement between the engaging projections 55 and the engaging claws 45 prevents the valve guide 52 from coming off.

In this manner, in the filter regulator 10 as described above, since the front ends of the four retaining bars 44 are put in the closed steady state, the valve 19 and the valve spring 51 are held on the inside of the four retaining bars 44. Furthermore, when the valve guide 52 is inserted, the valve guide 52 is held by the engaging claws 45, and the valve spring 51 is shifted from a state held by the engaging claws 45 to a state to abut on the engaging projections 55. In other words, the engaging claws 45 hold the valve spring 51 when it is inserted, and holds the valve guide 52 when it is inserted.

Therefore, when the filter element 54 is changed, or when both the filter element 54 and the valve 19 are changed at the time of maintenance, they can be detached from the filter regulator with ease. Furthermore, it is possible to incorporate a new filer element 54, in addition to this, to incorporate a valve 19, and to manufacture a filter regulator with ease in an improved assembling process.

The present invention is not limited to the above embodiment, and various modifications may be made without departing from the scope of the present invention. For example, the number of the retaining bars 44 is not limited to four. Any number of the retaining bars may be adopted except for a single retainer bar.

The filter regulator is applied to an air pressure line for supplying compressed air to a pneumatic apparatus and the like to purify the compressed air to be supplied to the pneumatic apparatus and the like, and adjust the pressure of the purified compressed air.

Although various embodiments of the present invention have been described and shown, the invention is not restricted thereto, but may also be embodied in other ways within the scope of the subject-matter defined in the following claims.

What is claimed is:

1. A filter regulator which purifies compressed air, adjusts a pressure of the compressed air, and discharges the purified and pressure-adjusted compressed air to outside, the filter regulator comprising:
    a port block including: a primary port into which compressed air flows, a secondary port through which the purified and pressure-adjusted compressed air is discharged to outside, a communication hole through which the primary port and the secondary port communicate with each other, and a valve seat provided to an opening end of the communication hole;
    a valve disposed so as to face the valve seat, the valve being driven by a pressure adjusting mechanism provided to the port block to open and close the communication hole;
    a valve spring which abuts on the valve, the valve spring applying a spring force to the valve in a direction of closing the communication hole;
    elastically-deformable retaining bars in which base ends thereof are attached to the port block, and front ends thereof are radially displaced between a closed steady state and an opened state;
    engaging claws provided to the front ends of the retaining bars, the engaging claws engaging with the other end of the valve spring disposed on the inside of the retaining bars when the retaining bars are in the closed steady state; and
    a filter element attached to the outside of the retaining bars when the front ends of the retaining bars are in the closed steady state,
    wherein the valve and the valve spring are attached to the inside of the retaining bars when the front ends of the retaining bars are in the opened state.

2. The filter regulator according to claim 1, further comprising a valve guide including: a cylindrical portion for guiding the valve which is slidable with respect to the cylindrical portion; and a flange which is in contact with the front ends of the retaining bars, wherein the cylindrical portion is provided with an engaging projection which abuts on the other end of the valve spring with the valve fitted into the cylindrical portion, and which engages with the engaging claws with the cylindrical portion pivoted.

3. The filter regulator according to claim 2, wherein the cylindrical portion is provided with a stopper, wherein when the valve guide is pivoted, the stopper abuts on the retaining bars to prevent the valve guide from being further pivoted.

4. The filter regulator according to claim 1, further comprising a louver provided with swirl vanes for swirling compressed air from the primary port, wherein the retaining bars and the louver are integrally provided with each other.

5. The filter regulator according to claim 2, wherein the valve guide is integrally provided with a baffle defining a swirl chamber above the filter element and a reserve chamber under the swirl chamber.

6. The filter regulator according to claim 1, wherein the pressure adjusting mechanism includes:
    a bonnet attached to the port block, a pressure-adjusting spring being provided to the inside of the bonnet;
    a diaphragm provided between the bonnet and the port block, the diaphragm defining a spring chamber and a pilot pressure chamber, the spring chamber having the pressure-adjusting spring housed therein and communicating with outside, and the pilot pressure chamber communicating with the secondary port; and
    a valve shaft placed between the valve and the diaphragm, the valve shaft being disposed in the communication hole and movable in an axial direction, wherein
    the pressure adjusting mechanism is adapted to adjust an opening degree of the valve according to a pressure in the pilot pressure chamber.

* * * * *